Oct. 5, 1948. M. W. WILSON 2,450,847
APPARATUS FOR TREATING RUBBER-REINFORCING CORD FABRIC
Filed Sept. 22, 1944
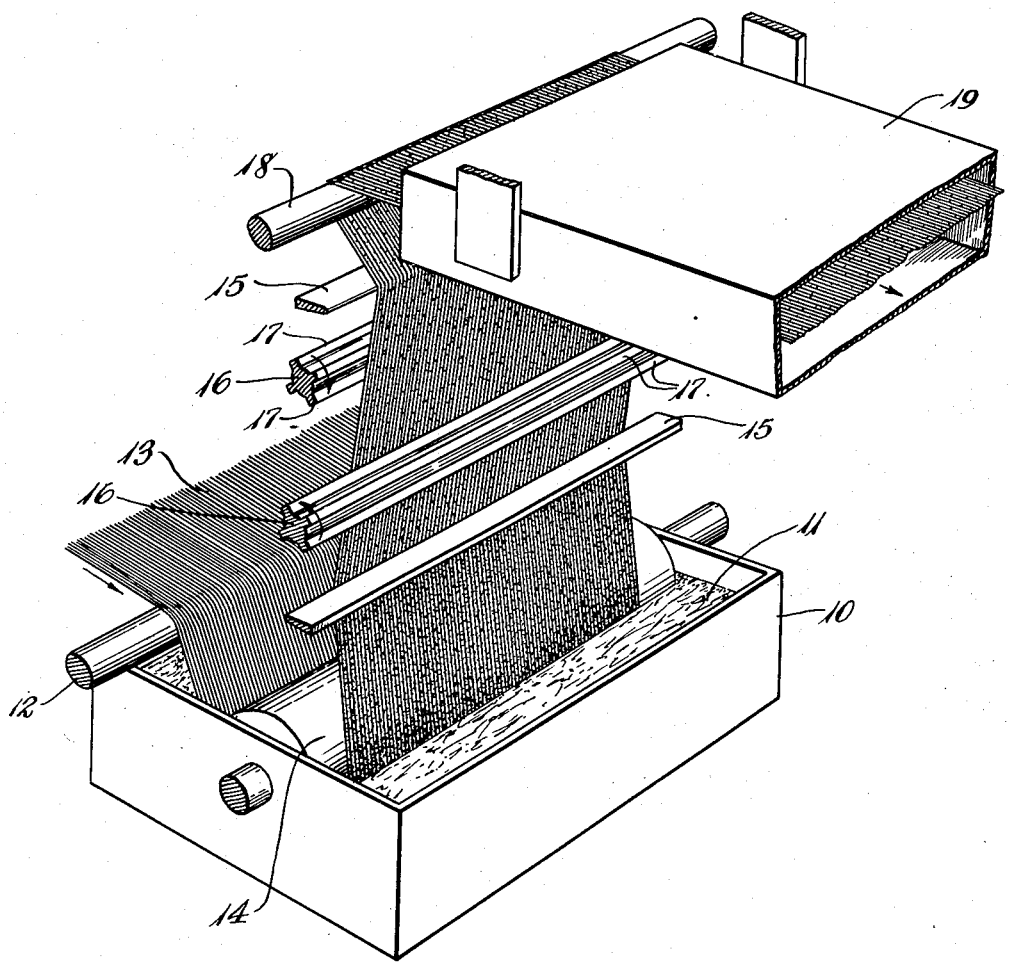
Inventor
Matthew W. Wilson
By Willis F. Avery
Atty.

Patented Oct. 5, 1948

2,450,847

UNITED STATES PATENT OFFICE 2,450,847

APPARATUS FOR TREATING RUBBER-REINFORCING CORD FABRIC

Matthew W. Wilson, Akron, Ohio, assignor to The B. F. Goodrich Company, New York, N. Y., a corporation of New York Application September 22, 1944, Serial No. 555,362

1 Claim. (Cl. 91—32)

This invention relates to the treatment of rubber-reinforcing cord fabric with a liquid adhesive composition designed to improve the adhesion between such fabric and the solid rubber compositions subsequently associated therewith in the manufacture of pneumatic tire carcasses and the like, and more particularly to an apparatus for applying such adhesives to cord fabric in a more efficient and economical manner.

It is known that the adhesion of fibrous textile materials used in rubber-reinforcing cord fabric such as cotton, rayons, and nylon, to rubbery materials such as natural and synthetic rubber compositions, may be greatly improved by first treating the textile material with certain liquid adhesive compositions such as commbinations of rubber latex with aqueous solutions of resin-forming materials such as resorcinol and formaldehyde. Consequently, in the manufacture of tires and other fabric-reinforced rubber articles it is extremely desirable, and in fact essential when the textile material employed in the fabric is rayon or nylon both of which ordinarily adhere poorly and insufficiently to rubber compositions, to apply such liquid adhesive compositions to the fabric prior to its association with the solid rubber composition.

Efficient and rapid application of such adhesives to tire cord fabric, particularly the weftless rayon cord fabric now preferred in the manufacture of tires, in large scale commercial operations, however, is quite difficult of attainment. When such fabric is simply dipped in a bath of the adhesive and then allowed to dry, the amount of adhesive picked up by the fabric is so great that prolonged drying times are required, even when high drying temperatures are used; with the result that it is impossible continuously to treat the fabric at a rate as fast as that at which the treated fabric may be associated with the solid rubber composition as by calendering or the like. In addition, the relatively large amount of adhesive picked up by the fabric during dipping often introduces other processing difficulties in that it fills the interstices of the weftless fabric and thereby often causes a sticking together and lumping of the individual cords thereof, with the result that proper alignment of the individual cords of the fabric in the body of rubber is rendered more difficult and consequently the desired reinforcement in the final rubber article is not always attained. Moreover, these disadvantages are not overcome by providing conventional means such as squeeze rolls for removing the excess adhesive deposited on the fabric since such rolls merely express excess liquid from the cords of the fabric itself without preventing the accumulation of liquid in the interstices.

This invention provides an apparatus whereby these and other operating difficulties in the treatment of cord fabric with adhesive may be overcome, and in addition it produces a treated cord fabric which has been found to possess improved rubber-reinforcing ability. Thus it not only enables the production of tires to be effected more rapidly, more efficiently, and more economically by reason of the increased speed and efficiency in treatment of the cord fabric, but it also effects improvements in the quality of the finished tire.

In using the apparatus of this invention, cord fabric which may be either weftless, weak-woven or picked fabric composed of cords of cotton or similar natural fibers, regenerated cellulose or cellulose derivatives, collectively designated as rayon, linear polyamides (polyhexamethylene adipamide for example) collectively designated as nylon, or other synthetic fibrous materials, and which is preferably weftless fabric composed of cords of high tenacity continuous filament or staple rayon, is continuously subjected to a series of operations designed to apply a small but effective amount of an adhesive composition on the surfaces of the individual cords thereof. These operations include first treating the fabric, as by dipping, spraying or the like, with a liquid adhesive composition; then beating the fabric while wet with the liquid adhesive to produce vibrations in the individual cords thereof and thus to remove a substantial amount of the adhesive associated with the fabric during the treating step; and finally drying the fabric.

The liquid adhesive composition employed to treat the cord fabric may be any of a wide variety of compositions well known to improve the adhesion of fibrous materials to rubbery materials. The adhesives ordinarily employed for this purpose consist of aqueous dispersions of rubbery materials such as natural or synthetic rubber latex combined with adhesion-promoting additives including combinations of chemical agents capable of reacting to form a synthetic resin such as combinations of resorcinol or other phenols with aldehydes such as formaldehydes or amides or amines or the like; and also including other materials such as casein and the like. Other liquid adhesive compositions comprising rubbery materials, whether compounded or uncompounded, and whether present in an aqueous medium or in a liquid medium other than water, such as an organic solvent, may also be used, as may any other liquid adhesive composition capable of improving the adhesion of fibrous materials to rubbery materials, it being understood that the nature of such compositions is well known to the art and as such is not a critical factor in this invention.

The beating of the fabric after its treatment with the liquid adhesive composition is of utmost importance in this invention and is largely responsible for the successful operation of the process and the advantages to be achieved thereby. While the means of effecting the beating may be varied, it being possible to employ a mechanical device which intermittently comes in contact with the body of the fabric or with the adhesive thereon, or to employ an intermittent blast of air or the like as a beating means, it is essential that the beating be of such a character as to produce vibrations in the individual cords composing the fabric. To facilitate the beating, the cords of the fabric may be placed under slight tension before or during the treatment of the fabric with adhesive or before or during the beating, if desired, and this tension may be maintained during the subsequent drying of the fabric.

By regulating the degree and duration of the beating to which the fabric is subjected it is possible to control the amount of adhesive applied thereto. Since the beating rapidly and efficiently removes a substantial amount of the liquid adhesive associated with the fabric after treatment therewith, it is easily possible to remove most of the liquid which would normally be present in the interstices of the fabric and to leave on the surfaces of the cords themselves a thin but uniform coating of the liquid adhesive. This thin coating of adhesive may be dried quite rapidly and as a result it becomes possible to treat fabric with adhesive in a continuous manner and at a rate as fast or faster than that at which the treated fabric may be calendered. The fabric so treated, moreover, has its individual cords in the same relative position as before treatment and hence the difficulties ordinarily experienced from the sticking of cords to one another on drying of the adhesive are largely avoided.

In practice, it is preferred to beat weftless rayon fabric after treatment with the adhesive sufficiently so that after drying only less than about 10% by weight, more preferably from 2 to 6% by weight, of the dry weight of the fabric consists of adhesive composition. This amount represents considerably less than the amount of adhesive ordinarily applied to fabric, the amount of adhesive retained during the conventional dipping and drying being somewhat more than 10% of the dry weight of the treated fabric. The degree and duration of beating necessary to effect this result will vary depending on the nature of the fabric being treated and the composition of the adhesive composition being used and may be readily determined for any particular set of conditions.

Control of the amount of adhesive deposited on the fabric by means of beating the fabric after treatment with adhesive makes it possible to vary the rate at which fabric is dipped in adhesive composition and to vary the type of fabric being dipped (from rayon to nylon to cotton, for example) without changing the composition or concentration of the liquid adhesive composition and while still insuring that the fabric being treated will have the optimum amount of adhesive applied thereto. The production of tires or other articles requiring the use of fabric treated with adhesive is thereby rendered much more efficient and economical.

To illustrate the invention in greater detail, reference is had to the accompanying drawing the sole figure of which is a diagrammatic view of a preferred apparatus for treating cord fabric in accordance with this invention. The apparatus consists in part of a trough 10 containing an adhesive composition 11, the trough being equipped with a guide roll 12 mounted thereon for delivering a sheet of weftless fabric 13 to the trough and with a roll 14 partially immersed in the adhesive composition for passing the fabric through the adhesive contained in the trough. Mounted above the trough 10 in the path of the fabric as it passes vertically from the trough are a pair of support blades 15, 15 arranged one above the other for supporting and guiding the fabric from the trough. Between the support blades one or more shafts 16, 16, each having a plurality of attached fins all numbered 17 and all extending the length of the shafts, are mounted in such a manner that they rotate either clockwise or counterclockwise and that the attached fins 17 intermittently come in contact with the fabric as it passes from the trough and between the support blades. Above the uppermost of the support blades 15 another guide roll 18 is provided and in a horizontal plane therewith there is provided a drying oven 19 through which the fabric is directed from guide roll 18. The support blades 15, 15 and shafts 16, 16 are preferably enclosed in a casing provided with an inlet and outlet for the fabric, which casing, however, is not shown.

In the operation of the apparatus a sheet of weftless rayon fabric 13 is passed from roll 12 around roll 14 through the adhesive composition 11 (which preferably consists of an aqueous dispersion of natural rubber latex containing about 7.5% by weight of rubber solids and also containing about 2% by weight of resorcinol and 1.5% by weight of formaldehyde) and thence to support bars 15, 15 between which the wet rayon fabric is subjected to repeated mechanical impacts delivered by contact of the fins 17 on the revolving shafts 16, 16 with the wet fabric thereby beating the fabric and producing vibrations in the individual cords thereof. From the uppermost support bar 15 the fabric is then passed around guide roll 18 and through drier 19 from which it emerges as rayon fabric, the individual cords of which contain a small amount of adhesive composition uniformly distributed on their surfaces, ready for incorporation with rubber in the manufacture of tires or other fabric-reinforced rubber articles.

When proceeding in the manner just described with the beating shafts 16 rotating at a speed of about 3600 R. P. M., it is possible continuously to treat fabric at a rate of over 40 yards per minute without operating difficulty and to produce thereby treated fabric containing about 5% of adhesive on the surfaces of the cords thereof. The amount of adhesive remaining on the cords may likewise be varied from 1 to 10% by varying the speed of rotation of the beating shafts. When a similar operation is carried out omitting the beating of the fabric, in an apparatus not including the rotatable beating shafts or in an apparatus provided with a pair of squeeze rolls or doctor blades in the place thereof, the speed of operation practically attainable is only about 10 yards per minute and a considerably greater amount of adhesive is left in the fabric both on the cords themselves and in the spaces between the cords.

The treated fabric produced in the manner of this invention is admirably suited for use in the manufacture of tires. For example, when treated weftless rayon fabric produced by the operation herein specifically described is employed as the reinforcing member in tire carcasses, tires of improved quality are obtained. This is believed partly due to the fact that because of the beating a lesser amount of adhesive is present in the cord fabric and the adhesive which is present is confined to the individual cords, although it may be possible that the improved quality of the reinforcing fabric is due to a change in the rayon cords themselves, brought about by the beating of the cords in a wet condition. It is to be understood however that the invention is not limited, unless otherwise specifically indicated, to any of these proposed explanations.

I claim:

Apparatus for treating weftless cord fabric preparatory to its incorporation in a body of rubbery material, said apparatus comprising in combination means for directing a weftless cord fabric composed of a plurality of individual cords of textile material in spaced-apart parallel relation along a predetermined path, means including a tank disposed along said path for applying adhesive liquid capable of being dried to solid form to said fabric as it progresses through said tank, guiding and tensioning means disposed generally above said tank for establishing an upwardly directed reach of the said fabric and for placing the individual cords thereof under tension in said reach, means located along said reach for removing from said fabric a portion of the applied adhesive liquid before drying thereof, without disturbing the spaced-apart parallel relation of the individual cords, said means consisting of a beater disposed along one face of said reach and another beater disposed generally above said first beater and along the opposite face of said reach, each of said beaters including a rapidly rotatable member disposed with its axis of rotation parallel to the plane of said reach and a plurality of projecting edges disposed longitudinally of the said member and adapted intermittently and vigorously to engage the tensioned cords of said fabric deflecting the said cords from their normal path and inducing vibrations therein sufficient to remove from the said fabric a portion of the said adhesive liquid from the individual cords thereof and substantially all of the said adhesive liquid from the interstices thereof, and heating means disposed further along said path and beyond the aforesaid beaters for drying the said fabric bearing the remaining adhesive liquid to produce a treated weftless cord fabric in which the individual cords possess a uniformly thin coating of solid adhesive but substantially retain their spaced-apart parallel relation.

MATTHEW W. WILSON.

REFERENCES CITED

The following references are of record in the file of this patent:

UNITED STATES PATENTS

| Number | Name | Date |
|---|---|---|
| 157,068 | Edwards | Nov. 24, 1874 |
| 270,717 | York and Lane | Jan. 16, 1883 |
| 343,387 | Newton | June 8, 1886 |
| 890,782 | Masurel-Leclercq | June 16, 1908 |
| 1,385,042 | Decker et al. | July 19, 1921 |
| 1,512,095 | Hopkinson | Oct. 21, 1924 |
| 1,883,535 | Burnett | Oct. 18, 1932 |
| 2,004,267 | Broockway | June 11, 1935 |
| 2,040,105 | Ritzert | May 12, 1936 |
| 2,325,126 | Giesler | July 27, 1943 |
| 2,326,372 | Lignian | Aug. 10, 1943 |